United States Patent [19]

Northup

[11] 4,013,437
[45] Mar. 22, 1977

[54] METHOD FOR FORMING GLASS BOTTLES

[75] Inventor: John D. Northup, Toledo, Ohio

[73] Assignee: Owens-Illinois, Inc., Toledo, Ohio

[22] Filed: May 15, 1975

[21] Appl. No.: 577,629

Related U.S. Application Data

[63] Continuation-in-part of Ser. No. 502,388, Sept., 1974, abandoned.

[52] U.S. Cl. .................................. 65/76; 65/77;
  65/80; 65/81; 65/233; 65/235; 65/263
[51] Int. Cl.² .................................................. C03B 9/14
[58] Field of Search ............ 65/77, 79, 80, 81, 232, 65/235, 263, 267, 233, 76

[56] References Cited

UNITED STATES PATENTS

| | | | |
|---|---|---|---|
| 2,043,065 | 6/1936 | Rowe | 65/80 |
| 2,336,821 | 12/1943 | Wadman | 65/80 X |
| 3,047,982 | 8/1962 | Olson | 65/80 |
| 3,272,612 | 9/1966 | Hamilton | 65/229 |
| 3,357,809 | 12/1967 | Colchagoff | 65/229 |
| 3,803,877 | 4/1974 | Becker | 65/79 |
| 3,846,103 | 11/1974 | Rowe | 65/79 |

Primary Examiner—S. Leon Bashore
Assistant Examiner—Frank W. Miga
Attorney, Agent, or Firm—D. T. Innis; E. J. Holler

[57] ABSTRACT

An improved method is disclosed for forming glass bottles by the blow and blow process. A parison mold having a one-piece annular blank mold section and split neck and shoulder mold sections is charged fully with molten glass. Air is subsequently blown through a manifold covering the upper end of the parison mold to force the molten glass into an annular space defined by a cavity in the neck mold section and a neck pin projected into the neck mold cavity. The neck pin is then reciprocated from the neck mold cavity, and air is blown through the molded neck to cause the molten glass to chill its surface by pressure contact with the inside of an upright truncated pyramidal-shaped cavity formed in the blank mold section. The glass which comes into contact with the cavity walls in the blank mold section develops a very uniform enamel due to the uniform cooling achieved with the solid annular blank mold section. The blank mold section is separated from the neck and shoulder mold sections which support the molded parison and the parison is expanded by blowing through the molded neck to stretch the enamel of the glass surface into a balloon shape. The expanded parison is inverted and inserted into a cavity in a split blow mold. The parison is then allowed to sag in the blow mold cavity as the enamel of the parison is reheated through conduction of heat from the hotter glass on the inside of the parison. After the parison sags a predetermined amount, the parison is expanded to fill the blow mold cavity and is held until the glass has chilled sufficiently to maintain its shape when removed from the blow mold.

3 Claims, 8 Drawing Figures

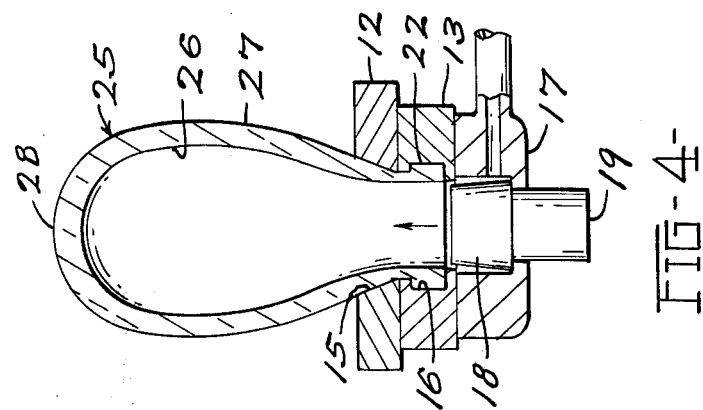
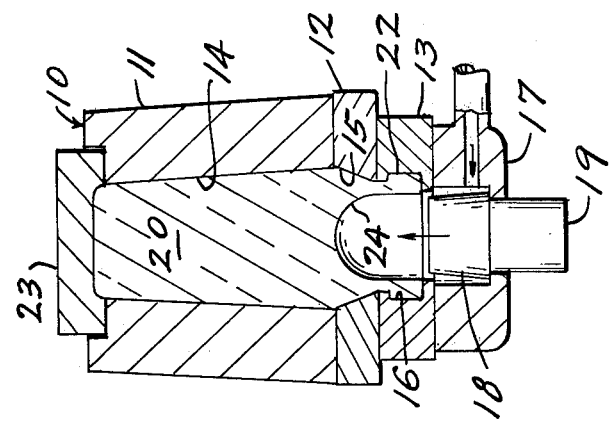
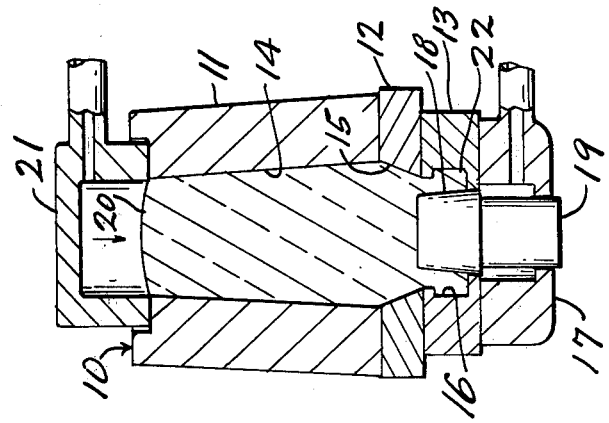
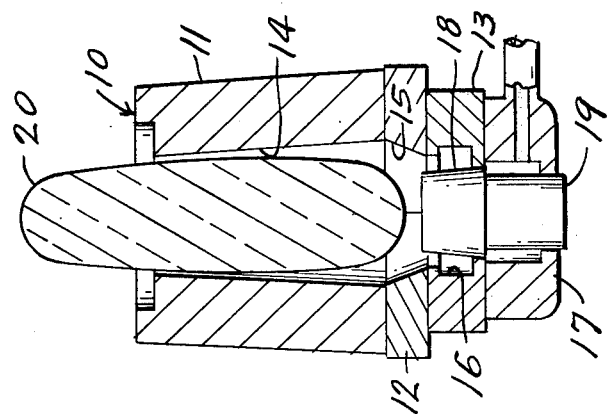

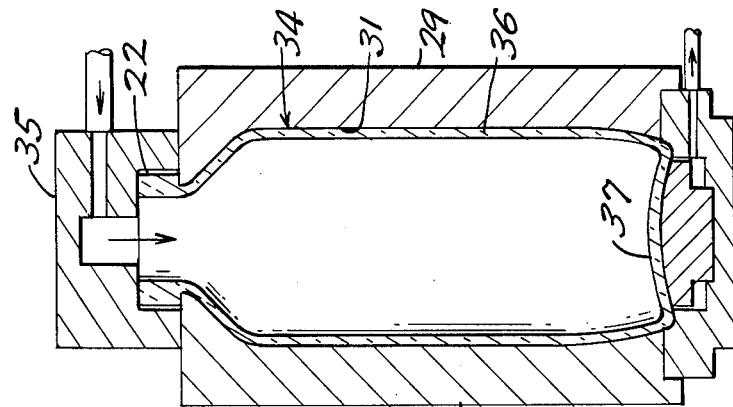
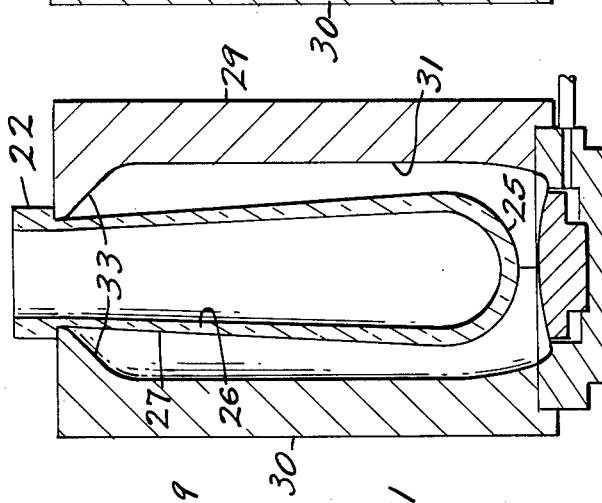
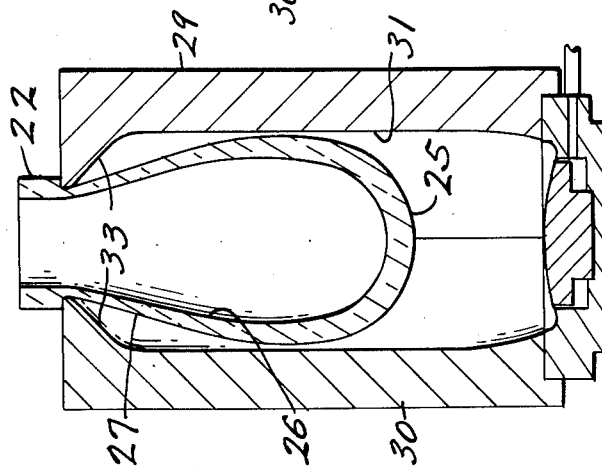
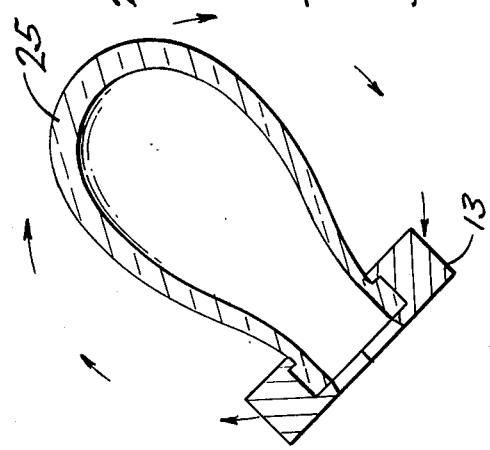

METHOD FOR FORMING GLASS BOTTLES

CROSS-REFERENCE TO RELATED APPLICATION

This is a continuation-in-part of my copending application Ser. No. 502,388 filed Sept. 3, 1974 now abandoned.

BACKGROUND OF THE INVENTION

This invention relates to glass manufacturing and more particularly to an improved method for manufacturing glass bottles by the blow and blow process.

In recent years, there has been a substantial increase in the number of glass bottles produced annually for use as pressure vessels in the packaging of beer, wine and carbonated beverages. The trend has been toward decreasing the weight of the glass in a given capacity container. This trend increases the importance of uniform glass distribution and maximum material strength. The strength of a glass bottle is limited by the thinnest sidewall area. Therefore, where a glass manufacturing process results in non-uniform wall thicknesses, the walls must be made of such a thickness that the thinnest area will withstand the maximum pressures and stresses placed upon the sidewall or bottom. To provide adequate thickness at the thinnest sidewall or bottom areas, other areas will contain unneeded glass which adds to the weight and cost of the bottle, as well as to the cost of shipping products packaged in the bottle. Therefore, any improvements which increase the uniformity of the sidewalls in a glass bottle used as a pressure vessel reduces both the weight and the material cost of the bottle.

The most common method for forming glass bottles of the "narrow-neck" design is known as the "blow and blow" process. This process is characterized by initially forming a parison from a gob of molten glass and subsequently blowing the parison into a final bottle shape. However, what is commonly known as a "settle-blow wave" occurs in the sidewalls of glass bottles produced by the basic blow and blow process. The bottles also have a horizontal non-uniformity. The sidewalls of the blown bottle have a vertical non-uniformity, being thinner in the region below the settle-blow wave than above the settle-blow wave. The lack of wall thickness uniformity tends toward a weaker bottle and necessitates the providing of extra glass thickness overall in order to create an adequate thickness in the lower sidewall area. U.S. Pat. No. 2,273,777 which issued on Feb. 17, 1942 to W. K. Berthold discloses an improved blow and blow process which reduces the settle-blow wave in the sidewalls of a blown glass bottle. This process involves forming a parison in a two-piece or split blank mold and subsequently blowing the parison to a final shape in a blow mold. The parison is of such a shape that both a blank mold and a neck mold must be of the split type to permit separation of the parison from the mold. The vertical seam separating the mold parts results in non-uniform cooling of the parison which in turn results in a non-uniformity in the wall thickness in a horizontal section of the blown bottle. The parison mold is initially charged with a gob of molten glass and the glass is blown downwardly to fill an annular space defined by the neck mold and a neck pin projecting into the neck mold. Subsequently, the neck pin is retracted and air is blown through the molded neck until the molten glass contacts the walls of the mold cavity and a baffle closing the upper end of the mold cavity. The baffle is removed and the parison is further blown through the molded neck until the molten glass projects a predetermined distance above the blank mold. The split blank mold sections are then separated from the parison and the parison is blown further. After blowing, the completed parison is inverted and inserted into the cavity of a conventional blow mold. Thick side and bottom walls of the parison quickly reheat the outer surfaces of the parison to a molten condition and the parison sags in the blow mold cavity. Air is then blown through the neck of the sagging parison forcing the molten glass into contact with the walls of the blow mold cavity to complete the blowing of a glass bottle. Although this process reduces the settle-blow wave in the sidewalls of the blown bottle, a noticeable settle-blow wave may still be present. The amount of settle-blow wave present in the bottle is determined by how full the molten glass charge fills the parison mold. Furthermore, the fact that the parison is partially blown in the parison mold with the upper baffle removed permits the surfaces of the end of the parison to be reheated to a less viscous state than the surfaces which remain in contact with the parison mold prior to inserting the parison into the blow mold. This appreciably reduces the strength of the glass in the finished bottle. It has been recognized in the glass industry that increasing the reheat time in the manufacturing cycle after the formation of the parison and before expansion in the blow mold creates a stronger bottle. The Berthold method inherently reduces the reheat time since the parison is formed of relatively thick sidewalls which will rapidly transmit heat to the outer surfaces and since the cool baffle plate is removed from the end of the parison prior to removing the parison body mold sections from the parison. Furthermore, the parison sidewalls will not be uniformly cooled by the split blank mold sections which form the parison. Therefore, the walls of the blown bottle will be non-uniform in a horizontal section.

SUMMARY OF THE INVENTION

According to the present invention, the blow and blow process for forming glass bottles is modified to eliminate the formation of a settle-blow wave in the bottle sidewalls and to provide a thinner, stronger bottle than has been produced by prior art methods. These improvements are achieved through the use of a one-piece blank mold which uniformly cools the surfaces of the parison, through increasing the charge size to substantially fill the parison mold cavity, through the formation of the "bubble" in the parison by expanding the parison in free air, and through providing time for a uniform reheat of the parison while it is present in the final blow mold prior to blowing the parison into a final shape.

According to the method of the present invention, the parison is initially formed in a mold consisting of three sections. The body of the parison is formed in a one-piece or solid blank mold section having a cavity in the shape of an upright, truncated pyramid. An intermediate or shoulder mold section which is of the split type is positioned immediately below the blank mold section while a split type neck mold section is positioned below the shoulder mold section. Initially, a neck pin projects into the neck mold section to define an annular cavity which forms the neck of the bottle. The parison mold cavity is initially charged with a gob of molten glass which substantially fills the cavity. Air pressure is then applied to the upper end of the blank mold cavity to force molten glass into the annular cavity in the neck mold section to insure that all air is expelled and that the cavity in the neck mold section is completely filled. Subsequently, a baffle is placed over the upper end of the blank mold section, the neck pin is retracted from the neck mold section and the parison is counterblown through the neck mold section, forcing the molten glass into pressure contact with the walls of the blank mold section and the baffle. At this time, the surfaces of the blank mold cavity and the baffle uniformly chill and form an enamel or skin on the contiguous glass surfaces. The blank mold section and baffle are then lifted or separated from the parison, leaving the parison supported by the shoulder and neck mold sections. A second counterblow through the molded neck expands the parison to a desired size. At this point in the cycle, the expanded parison may be allowed to reheat if additional time is available on the blank side of the cycle before the blow mold is available. The expanded parison is then inverted and inserted into a shaped cavity in a conventional split blow mold. When the parison is initially inserted into the blow mold cavity, the enamel on the outer surfaces of the parison will be reheated through conduction from the hotter glass within the parison walls. As the outer surfaces are reheated, the parison will sag or elongate within the blow mold cavity. When the parison has sagged by a predetermined amount, it is then expanded to its final shape. This may be accomplished by applying a vacuum through a manifold to the seam between the mold and a bottom plate closing the bottom of the blow mold cavity and to the seams of the blow mold. Air pressure also may be applied through the neck of the parison to blow the molten glass into a final bottle shape, as defined by the blow mold cavity.

By providing a one-piece blank mold for initially forming the parison, the outer surfaces of the parison will be cooled more uniformly than that achieved in the prior art which teaches the use of split type molds in the blow and blow process, and the parison walls will be of a more uniform thickness. By filling the blank mold completely on loading, the settle-blow wave is eliminated and the vertical distribution of glass is more uniform. Also by reheating on both the blank side and the blow side of the bottle machine, the bottle produced by the above-described method will be stronger than that achieved from prior art blow and blow processes for manufacturing bottles.

Therefore, it is a preferred object of the invention to provide an improved method for manufacturing glass bottles by the blow and blow process.

Another object of the invention is to provide a method for manufacturing glass bottles by the blow and blow process in which the uniformity of the bottle sidewalls is increased both horizontally and vertically.

Still another object of the invention is to provide a method for manufacturing glass bottles by the blow and blow process in which the strength of the bottles is increased.

Other objects and advantages of the invention will become apparent from the following detailed description, with reference being made to the accompanying drawings.

BRIEF DESCRIPTION OF THE DRAWINGS

FIG. 1 is a fragmentary sectional view of apparatus for producing glass bottles in accordance with the method of the present invention and showing a solid blank mold being loaded with a gob of molten glass;

FIG. 2 is a fragmentary sectional view of the blank mold showing the molten glass being blown into a cavity defined by the blank mold, a shoulder mold, a neck mold section and a neck pin to mold the neck of a parison;

FIG. 3 is a fragmentary sectional view showing the glass parison being chilled by pressured contact with the molds by a counterblow through the previously molded parison neck;

FIG. 4 is a fragmentary sectional view showing the parison, after removal of the solid blank mold and baffle, being blown into a final shape in free air by a second counterblow through the molded parison neck and allowed to reheat in this position when the counterblow air is discontinued;

FIG. 5 is a fragmentary sectional view showing the expanded parison being inverted as it is supported by the neck mold section of the parison mold;

FIG. 6 is a fragmentary cross-sectional view showing the expanded parison immediately after it is inserted into the cavity of a blow mold.

FIG. 7 is a fragmentary sectional view showing the parison as it sags or elongates in the blow mold cavity; and FIG. 8 is a fragmentary sectional view showing the glass bottle expanded to a final shape in the cavity of the blow mold.

DESCRIPTION OF THE PREFERRED EMBODIMENT

Turning now to the drawings, FIGS. 1 through 8 sequentially show the steps for forming a glass bottle by the improved blow and blow process of the present invention. The figures show the manner in which a parison is initially shaped and chilled in a parison mold, then blown in air, and the manner in which the shaped parison is blown into a final bottle shape. Details are not shown of apparatus for supporting and operating the various sections of the parison mold and the blow mold and the manner in which compressed air supplied to blow the glass is controlled since such apparatus is old and well known in the glass bottle manufacturing art.

Referring first to FIG. 1, the parison is initially shaped in a parison mold 10. The parison mold 10 consists of three sections: an upper or blank mold section 11, an intermediate or shoulder mold section 12 and a lower or neck mold section 13. The blank mold section 11 is formed from a solid piece of metal and is shaped to define an upright truncated pyramidal cavity 14. The shoulder mold section 12 defines a cavity 15 which connects the cavity 14 with an annular cavity 16 within the neck mold section 13. The shoulder mold section 12 and the neck mold section 13 must be of the split type to permit removal or separation from the parison after blowing. Moreover, the total height of the sections 12 and 13 is appreciably less than the height of the blank mold section 11.

During initial molding of the parison, a manifold 17 closes the lower opening to the cavity 16 in the neck mold section 13. A tapered head or end 18 of a neck pin 19 projects through the manifold 17 into the neck cavity 16. The neck pin head 18 is tapered such that it engages the lower edge of the neck mold section 13 to prevent molten glass from leaking out of the lower edge of the neck cavity 16. After the mold sections 11, 12 and 13, the manifold 17 and the neck pin 19 are positioned together, a gob of molten glass 20 is charged into the mold cavities 14, 15 and 16. The gob 20 should be of a size to substantially fill the cavities 14, 15 and 16 upon loading.

As shown in FIG. 2, a manifold 21 is placed over the upper end of the blank mold cavity 14 after such cavity is charged with the gob of molten glass 20. Compressed air or other gas is then applied to the manifold 21 from a suitable external source (not shown). The impact of the gob falling into the cavities 14, 15 and 16 and the compressed air forces the molten glass 20 downwardly in the cavity 14, causing the molten glass to settle or flow into contact with the walls of the cavity 15 in the shoulder mold section 12 and the cavity 16 defined by the neck mold section 13 and the head 18 of the neck pin 19. Sufficient force is exerted on the molten glass 20 by the impact and the compressed air to complete formation of a neck 22 for the bottle being produced. The neck 22 may have any desired shape, such as a rim adapted to receive a pressed-on bottle cap or threads adapted to receive a suitable threaded bottle cap.

After the neck 22 is molded, the manifold 21 is removed and replaced with a baffle 23 for closing the upper end of the blank mold cavity 14, as shown in FIG. 3. The neck pin 19 is also retracted from the cavity 16 in the neck mold section 13 and compressed air or gas is applied to the manifold 17 for forcing the molten glass 20 into pressured contact with the mold sidewalls defining the cavity 14 and the baffle 23. As the molten glass is forced into contact with the sidewalls of the blank cavity 14, a bubble 24 forms in the glass 20. The bubble 24 should have a volume of no more than approximately 10 percent of the total volume of the cavities 14, 15 and 16 to prevent a settle-blow wave in the bottle being blown. While the molten glass 20 is in pressure contact with the sidewalls of the blank mold cavity 14 and the baffle 23, its surfaces are chilled sufficiently to form an enamel or skin. Since the body mold section 11 is formed from a solid piece of metal, the contiguous glass surfaces are chilled uniformly to create a uniform enamel on the parison and no vertical mold section separation marks will appear when the blank mold section 11 is separated from the glass 20.

Turning to FIG. 4, the blank mold section 11 and baffle 23 have been separated from the shoulder mold section 12 and neck mold section 13 of the parison mold 10. The parison remains supported by the shoulder mold section 12 and the neck mold section 13. Compressed air is again applied to the manifold 17 for a second counterblow to form an expanded parison 25. The expanded parison 25 has a shape appreciably larger than that defined by the cavity 14 of the removed blank mold section 11. It will be noted from FIG. 4 that the parison 25 has interior wall surfaces 26 and exterior sidewall surfaces 27 which are substantially parallel, resulting in a fairly uniform wall thickness throughout the portions of the parison 25 extending above the shoulder mold section 12. The uniformity of the parison walls is influenced by the degree to which the parison is blown. If the parison is blown less than that shown in FIG. 4, the bottom 28 will be thicker than the sidewalls, while if it is blown more the bottom 28 will be thinner than the sidewalls.

After the expanded parison 25 is formed, the shoulder mold section 12 is removed from the parison 25 by separating or splitting its two halves. The parison is then supported solely by the neck mold section 13. As shown in FIG. 5, the expanded parison 25 supported by the neck mold section 13 is inverted. Inversion must be such as to prevent distortion or warpage of the parison 25 as it is rotated. The parison is revolved 180° or until it is completely inverted.

After the expanded parison 25 is inverted by revolving through 180°, split mold sections 29 and 30 of a conventional blow mold are closed about the parison 25, as shown in FIG. 6. The blow mold sections 29 and 30 define an interior cavity 31 having a shape corresponding to the desired finished shape for the bottle being blown. The bottom of the cavity 31 is closed by means of a vacuum manifold and bottom plate 32. The upper end of the cavity 31 is defined by radially inwardly directed flanges 33 which define the shape of the shoulder of the bottle being blown. The parison 25 is supported in the blow mold sections 29 and 30 by the previously blown bottle neck 22 resting upon the flanges 33. It will be noted from FIG. 6 that when the parison 25 is initially inserted within the blow mold cavity 31, it maintains the shape to which it was blown, as shown in FIGS. 4 and 5. This shape is maintained due to the fact that the exterior wall surfaces 27 of the parison 25 were chilled while the parison was being formed in the blank mold section 11.

Although the exterior wall surfaces 27 of the parison 25 had been chilled to form an enamel in a solid or very viscous state, the glass within the center of the sidewalls remains hotter and more fluid. As the parison remains within the blow mold cavity 31, the exterior wall surfaces 27 continue to be reheated by conduction from hotter glass within the parison walls. Reheating initially began as soon as the parison was removed from the blank mold section 11. As the exterior wall surfaces 27 are reheated and become less viscous, the parison 25 will elongate or sag within the blow mold cavity 31, as shown in FIG. 7. The parison 25 is permitted to elongate until it nearly reaches the bottom of the cavity 31. However, it preferably is not permitted to sag to the point wherein it actually contacts the bottom plate 32. The reheat time effects the final strength of the blown bottle. By providing a relatively long reheat time, the strength of the bottle is increased. This increase permits blowing a bottle with thinner sidewalls to obtain a predetermined bottle strength than that acquired with a shorter reheat time. A more effective and uniform reheat is achieved because of the uniform chilling of the parison sidewalls. Therefore, a strong, thin-walled bottle may be blown by the process described herein.

After the parison 25 has sagged in the cavity 21 by a predetermined amount, the parison 25 is expanded and cooled to form a bottle 34. The parison 25 is expanded to conform with the blow mold cavity 31 by any conventional method. For example, a vacuum may be applied between the parison 25 and the blow mold to expand the parison 25, compressed air may be applied through the neck 22 to expand the parison 25, or both a vacuum and compressed air may be used. The vacuum is applied through the vacuum manifold and bottom plate 32 to bottom and side seams of the cavity 31 to expand the parison 25 to conform with the blow mold cavity 31. Or, compressed air or gas is blown through a manifold 35 placed over the bottle neck 22 to blow the molten glass into contact with walls of the cavity 31 to form the bottle 34. The combined vacuum and blowing tends to produce a more uniform distribution of the glass in the sidewalls and bottom of the bottle 34 over that achieved by merely blowing the glass into conformity with the mold cavity 31. After the parison 25 is expanded to the shape of the bottle 34, it is held in the blow mold to cool until the glass has the necessary degree of rigidity to allow its removal from the blow mold.

A strong bottle 34 having a uniform, thin sidewall 36 and bottom 37 is produced by the above-described process. The uniformity of the sidewall 36 and bottom 37 permit manufacturing the bottle 34 with a thinner sidewall and bottom than that necessary in the past to achieve a desired bottle strength. This reduces the weight of glass necessary for forming the bottle 34, thereby reducing the cost of such bottle by saving material and reducing transportation costs for the bottle and increasing production speed.

It will be appreciated that various modifications and changes may be made in the above-described process for manufacturing glass bottles without departing from the spirit and scope of the following claims.

What I claim is:

1. The method of forming a glass container or the like having thin walls of uniform thickness which comprises:
    feeding a charge of molten glass to a fixed, inverted one-piece parison body mold, split shoulder mold and neck mold forming a composite cavity therein;
    compacting the charge of glass in the composite cavity in the inverted blank or parison mold;
    counter-blowing the charge against the walls of the mold cavity and against a bottom closing baffle at the upper end of the inverted blank or parison mold;
    removing said baffle and the parison body mold;
    applying air under pressure to the interior of the parison while being supported by the neck mold and shoulder mold to expand the glass both vertically and transversely to the extent that the wall thickness of the expanded portion of the parison is of uniform thickness throughout;
    removing the shoulder mold from the parison;
    inverting the parison while being supported in the neck mold;
    enclosing the inverted parison within a blow mold;
    permitting the parison to sag within the blow mold to an extent less than the full height of the blow mold;
    and then expanding the parison within the blow mold cavity to form the container in its final form with uniform wall thickness.

2. A method for forming a hollow blown glassware article, as set forth in claim 1, wherein said parison is expanded in said blow mold cavity by applying a vacuum to said blow mold cavity.

3. A method for forming a hollow blown glassware article, as set forth in claim 1, wherein said parison is expanded in said blow mold cavity by applying a vacuum to said blow mold cavity simultaneously with blowing through said neck.

* * * * *